(12) United States Patent
Tsirkin

(10) Patent No.: US 11,966,743 B2
(45) Date of Patent: *Apr. 23, 2024

(54) REVERSE ORDER QUEUE UPDATES BY VIRTUAL DEVICES

(71) Applicant: Red Hat, Inc., Raleigh, NC (US)

(72) Inventor: Michael Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 109 days.

This patent is subject to a terminal disclaimer.

(21) Appl. No.: 17/586,385

(22) Filed: Jan. 27, 2022

(65) Prior Publication Data

US 2022/0147362 A1   May 12, 2022

Related U.S. Application Data

(63) Continuation of application No. 16/869,915, filed on May 8, 2020, now Pat. No. 11,237,836, which is a continuation of application No. 15/991,490, filed on May 29, 2018, now Pat. No. 10,649,784.

(51) Int. Cl.
*G06F 9/38* (2018.01)
*G06F 9/455* (2018.01)
*G06F 9/54* (2006.01)

(52) U.S. Cl.
CPC ........ *G06F 9/3856* (2023.08); *G06F 9/45545* (2013.01); *G06F 9/45558* (2013.01); *G06F 9/544* (2013.01); *G06F 2009/45583* (2013.01)

(58) Field of Classification Search
CPC ............... G06F 9/3855; G06F 9/45545; G06F 9/45558; G06F 9/544; G06F 2009/45583; G06F 12/0851; G06F 12/0857; G06F 2212/1008; G06F 2212/1024; G06F 2212/152
USPC ........................................................ 711/154
See application file for complete search history.

(56) References Cited

U.S. PATENT DOCUMENTS

| | | | |
|---|---|---|---|
| 9,727,364 B2 | 8/2017 | Tsirkin | |
| 9,804,904 B2 | 10/2017 | Nelson | |
| 9,838,321 B2 | 12/2017 | Contavalli | |
| 10,198,299 B1 | 2/2019 | Xu et al. | |
| 2003/0026277 A1 | 2/2003 | Pate et al. | |
| 2004/0123055 A1 | 6/2004 | Solomon et al. | |
| 2017/0126549 A1 | 5/2017 | Paramasivam | |

*Primary Examiner* — Hua J Song

(57) ABSTRACT

A system includes a memory including a ring buffer having a plurality of slots, a processor in communication with the memory, a guest operating system, and a hypervisor. The hypervisor is configured to detect a request associated with a memory entry, retrieve up to a predetermined quantity of memory entries in the ring buffer from an original slot to an end slot, and test a respective descriptor of each successive slot from the original slot through the end slot while the respective descriptor of each successive slot in the ring buffer remains unchanged. Additionally, the hypervisor is configured to execute the request associated with the memory entries and respective valid descriptors. The hypervisor is also configured to walk the ring buffer backwards from the end slot to the original slot while clearing the valid descriptors.

20 Claims, 8 Drawing Sheets

REVERSE ORDER QUEUE UPDATES BY VIRTUAL DEVICES

CROSS REFERENCES TO RELATED APPLICATIONS

This application is a continuation U.S. patent application Ser. No. 16/869,915, filed on May 8, 2020, which is a continuation of U.S. patent application Ser. No. 15/991,490, filed on May 29, 2018, now U.S. Pat. No. 10,649,784, issued on May 12, 2020, the entire contents of which are hereby incorporated by reference.

BACKGROUND

Computer systems may routinely copy memory entries from one memory to a different memory. For example, while forwarding incoming networking traffic to a physical or virtual machine, packets may be received and later copied to another memory location. Processors may execute instructions to read, write, and copy memory entries, such as packet addresses to forward networking traffic to different machines. For example, memory entries may be temporarily stored in ring buffers on a first-in-first-out basis before being copied to the memory associated with a different machine. Specifically, incoming networking traffic may be stored on a ring buffer and later copied to virtual machine memory.

SUMMARY

The present disclosure provides new and innovative systems and methods for reverse order queue updates by virtual devices. In an example, a system includes a memory including a ring buffer having a plurality of slots, a processor in communication with the memory, a guest operating system, and a hypervisor. The hypervisor is configured to detect a request associated with a memory entry, retrieve up to a predetermined quantity of memory entries in the ring buffer from an original slot to an end slot, and test a respective descriptor of each successive slot from the original slot through the end slot while the respective descriptor of each successive slot in the ring buffer remains unchanged. Additionally, the hypervisor is configured to execute the request associated with the memory entry and the respective descriptor responsive to determining the respective descriptor is a valid descriptor. The hypervisor is also configured to walk the ring buffer backwards from the end slot to the original slot and clear the valid descriptor in each slot between the end slot and the original slot.

In an example, a method includes detecting, by a hypervisor, a request associated with a memory entry. Additionally, the hypervisor retrieves up to a predetermined quantity of memory entries in the ring buffer from an original slot to an end slot and tests a respective descriptor of each successive slot from the original slot through the end slot while the respective descriptor of each successive slot in the ring buffer remains unchanged. Responsive to determining the respective descriptor is a valid descriptor, the hypervisor executes the request associated with the memory entry and the respective descriptor. Then, the hypervisor walks the ring buffer backwards from the end slot to the original slot and clears the valid descriptor in each slot between the end slot and the original slot.

In an example, a method includes receiving, by a hypervisor, a request associated with a memory entry. The hypervisor stores a location of an original slot in hypervisor memory and tests a respective descriptor of each successive slot from the original slot through the end slot while the respective descriptor of each successive slot in the ring buffer remains unchanged. Responsive to determining the respective descriptor is a valid descriptor, the hypervisor executes the request associated with the memory entry and the respective descriptor. Responsive to executing the requests associated with each of the respective descriptors in the original slot through the end slot, the hypervisor increments a counter from an original value to an end value. Additionally, the hypervisor clears the valid descriptor in each slot between the end slot and the original slot while walking the ring buffer backwards.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
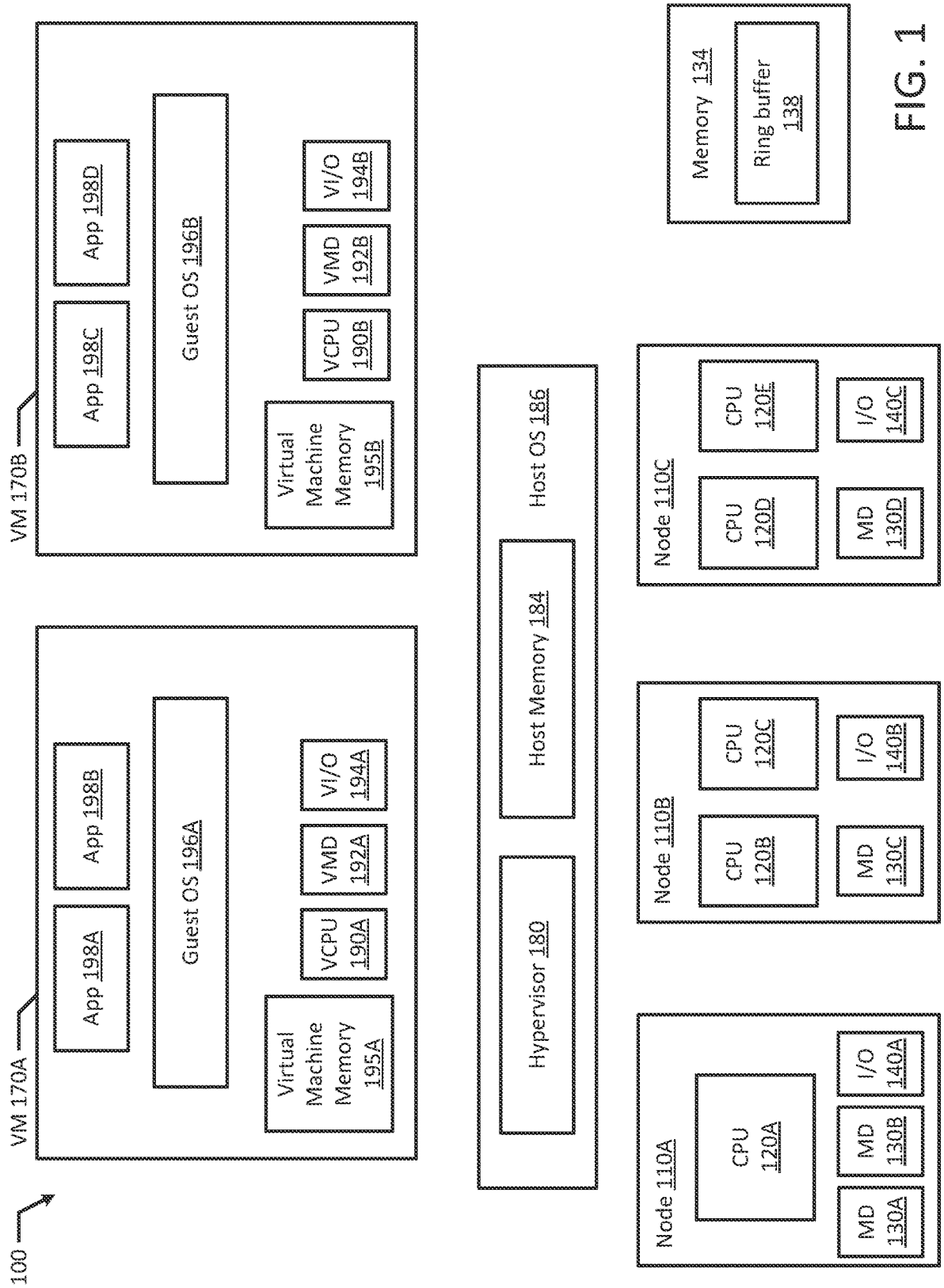
FIG. 1 illustrates a block diagram of an example computing system according to an example embodiment of the present disclosure.

Techniques are disclosed for reverse order queue updates by virtual devices when processing requests such as requests to transmit data from one memory location (e.g., ring buffer) to a different memory, to copy a respective memory entry or packet into virtual machine memory, or to copy a respective memory entry or packet out of virtual machine memory. For example, the techniques disclosed may be used when transmitting network traffic (e.g., network traffic from a cloud computing platform) such as a data packet to or from virtual devices, such as a virtual machine ("VM"). For example, a hypervisor may transmit packets to/from virtual machines by copying memory entries from a ring buffer and transmitting the memory entries to virtual machine memory. Virtualization allows a host machine to run multiple virtual environments, for example using a hypervisor (e.g., Kernel-based Virtual Machine ("KVM")) on an operating system, such as Red Hat® Enterprise Linux® ("RHEL"). When handling network traffic (e.g., network traffic from a cloud computing platform such as the Red Hat® OpenStack® Platform), hypervisor vendors and operating system ("OS") vendors often attempt to improve networking speed for hypervisors for use in networking stacks. An example vendor is Red Hat, which offers RHEL.

Transmitting a packet from a virtual machine typically involves storing an address of the packet in a queue of a virtual network interface. After the packet is transmitted, a hypervisor notifies a guest operating system ("OS") about the packet transmission. When emulating a virtual network interface controller ("vNIC"), descriptors are typically stored in guest memory where the guest OS marks the descriptor valid for transmission and a hypervisor clears the valid marking to signal completion.

The descriptors are commonly arranged in a ring structure, and after processing the last descriptor in the ring, the guest OS proceeds back to the first descriptor to mark additional packets as valid for transmission. The act of receiving the data (e.g., packets) and copying the data may be executed on the same processor (e.g., central processing unit "CPU"), however, parallelizing the actions on separate processors or separate processor cores may provide significant performance advantages. Currently, techniques of parallelizing the receiving and copying may involve a first CPU receiving an interrupt from a network interface controller ("NIC"), receiving packets from the NIC, and adding the packets to a list in a shared memory, which are then marked as valid for transmission. A second CPU runs a thread to retrieve the packets from the list and copy the packets into VM memory. After the packets are transmitted or copied, the valid descriptors are cleared. Because the parallel process utilizes two CPUs, the process adds additional overhead because adding and removing packets on one list requires cross-CPU communication through shared memory. Traditionally, a linked list or a producer/consumer ring was used without much added performance as false cache sharing typically outweighed the benefits of parallelism. For example, false cache sharing is a performance-degrading usage pattern resulting from periodically accessing data that one of the CPUs (e.g., a first CPU) will not alter (e.g., unaltered data) and the unaltered data shares a cache block or cache line with data that is altered. Because the unaltered data shares a cache block or cache line with altered data, a caching protocol may force the other CPU (e.g., a second CPU) to reload the whole unit of data even though much of the data remains unchanged or unaltered. Thus, the second CPU bears the caching overhead associated with the reload to maintain shared access of the resource (e.g., linked list or a producer/consumer ring). Specifically, if two processors operate on independent data in the same memory address region storable in a single cache line, the entire cache line may have to be refreshed causing memory stalls in addition to wasting system bandwidth.

Additionally, other approaches such as a typical circular buffer design often creates cache line bounces between the two CPUs or CPU cores (e.g., a first CPU or core associated with a hypervisor and a second CPU or core associated with a guest OS). It should be appreciated that when referring to a CPU or core associated with the hypervisor, the CPU may be a virtual CPU ("vCPU"). Similarly, when referring to a CPU or core associated with the guest OS, the CPU may be a vCPU. For example, a ring data structure (e.g., an array with a plurality of slots) may be used with a guest OS and a hypervisor. In the disclosed implementation, the processor associated with a guest OS, which may be referred to as an interrupt handling processor, may maintain a producer pointer. The producer pointer may store data, such as the address of each packet received at the slot addressed by the producer pointer. The processor associated with the guest OS may increment the pointer to address the next slot, thereby wrapping around at the end of the array. To avoid overruns, before marking the data (e.g., the address of each packet and/or packet) as valid, the guest OS may test the value in each slot. If the descriptor value is valid, the new data is not stored in the list and may be discarded. The processor associated with a hypervisor, which may be referred to as a data copying processor, may maintain a consumer pointer. The hypervisor may test the value pointed to by the consumer pointer. If the descriptor value has been cleared and is invalid, then the array is empty and the hypervisor may stop and wait for more packet entries marked valid for transmission. If the descriptor value is valid, the hypervisor may retrieve the data, such as a packet address. Then, the hypervisor may clear the valid descriptor and may advance the consumer pointer to the next slot. The retrieved data may be copied to a second memory location (e.g., virtual machine memory).

Clearing a valid descriptor (e.g., overwriting the valid bit or storing a NULL value in a slot) advantageously allows reuse of the slot for additional data (e.g., forwarding a new packet). However, this data structure may experience performance bottlenecks. For example, when a driver is highly optimized, transmitting may be slower than validating packets for transmission. Thus, the ring may be full for a large part of the time, and as a result, as the hypervisor signals completion of an entry, the entry is immediately made valid again by the interrupt handling processor associated with the guest OS, which causes a cache line to bounce between the processors and results in a significant slowdown. Due to the bottleneck and resulting slowdown, the hypervisor may be unable to get ahead of the guest OS resulting in cache line bounces for each data operation in the ring buffer.

A proposed solution to the cache line bounces described above is to load a network interface controller ("NIC") driver in a virtual machine as a pass-through to avoid the need for packet forwarding. However, this approach breaks migration and overcommit, which may cause the host or computer system to crash. Additionally, even though producing or consuming multiple memory entries or packets at once may cause a single invalidation, such batching may require waiting for multiple packets to become available through receive coalescing or rx coalescing, which may increase latency and add overhead for running timers on the host. For example, rx coalescing may wait a predetermined amount of time before raising an rx interrupt after a memory entry or packet has been received. Similarly, rx coalescing may involve waiting for a specified number of memory entries or packets to queue up before raising an rx interrupt. Further, the proposed solution of loading a NIC driver in a virtual machine as a pass-through (e.g., with rx coalescing) may cause delays while waiting for additional packets and may result in additional overhead as a result of using a complex consumer or producer processor Another proposed solution to the cache line bounces described above is to reserve extra slots in the ring, which would remain unused to space out the guest OS and the hypervisor such that they were not accessing the same cache line. However, ring size is often designed in powers of two to allow optimization. If a ring buffer with 128 active slots is needed, then by adding unused slots, the implemented ring would be designed with 256 slots (e.g., next power of two above 128 slots). For example, if 128 active slots will be utilized, and 10 slots will remain unused, then the ring needs a minimum of 138 slots. Due to the common practice of increasing ring buffer size by a factor of two, the next logical ring buffer size is 256 slots (e.g., next largest size up from 128 slots). However, larger rings are problematic because the processors keep watch over the ring, and a larger ring puts more pressure on cache. Moreover, only actively using, for example, 128 slots of 256 slots is not an efficient use of hardware resources.

As described in the various example embodiments disclosed herein, to prevent slowdown and reduce the frequency of cache line bounces, the hypervisor retrieves up to a predetermined quantity of memory entries (e.g., data such as packet addresses) in the ring. For example, for each successive slot in the ring, the hypervisor may test a respective descriptor of each slot without clearing the descriptor. Thus, the hypervisor may test the descriptors associated with the predetermined quantity of memory entries in the slots or may stop testing the descriptors upon reaching a cleared descriptor value in a slot (e.g., there are no more memory entries in the ring marked valid for transmission). Then, the hypervisor may walk the ring backwards until the hypervisor reaches the original location and may clear each of the valid descriptors in each of the respective slots while walking backwards. The retrieved memory entries (e.g., packet addresses) may be copied into a second memory location (e.g., virtual machine memory). Due to clearing the valid descriptors in groups, the guest OS is held back and only starts adding and marking new entries in the ring as valid for transmission after the hypervisor has made some significant progress. Thus, the hypervisor may advantageously retrieve a group of packets elsewhere in the ring (e.g., a few slots ahead of the guest OS) such that retrieving a single packet no longer causes cache line bounces between the processor associated with the guest OS and the processor associated with the hypervisor even when the ring is full or almost full. Thus, cache line bounces are advantageously reduced and performance is improved. For example, the above modification may improve packet throughput by approximately 10 percent or more.

Instead of the cache line constantly bouncing between the processor associated with the guest OS and the processor associated with the hypervisor, the hypervisor retrieves and transmits up to a predetermined quantity of memory entries at a time, which advantageously allows the hypervisor to retrieve and complete multiple requests before the cache line bounces to the processor associated with the guest OS, thereby improving performance and throughput without doubling the ring size and wasting hardware resources or breaking migration and overcommit as described above.

FIG. 1 depicts a high-level component diagram of an example computing system 100 in accordance with one or more aspects of the present disclosure. The computing system 100 may include an operating system (e.g., host OS 186), one or more virtual machines (VM 170A-B), nodes (e.g., nodes 110A-B), and memory 134 including a ring buffer 138. Ring buffer 138 may be a data structure using a single, fixed-size buffer as if it were connected end-to-end (e.g., in a ring). In an example, the ring buffer 138 may be a first-in-first-out ("FIFO") data structure. For example, memory entries such as packet addresses may be written into and retrieved from the ring buffer 138. Additionally, the ring buffer 138 may have a plurality of slots, which may store memory entries. The slots may be tracked by pointers or indices. Each memory entry may be associated with a descriptor, which may be marked as valid and may later be cleared or invalidated. A descriptor may be a bit, a field entry, an address, a packet length, etc. Similarly, a valid descriptor may be a valid bit, a special value in the field entry, a non-zero address, a non-zero packet length, etc.

Virtual machines 170A-B may include a guest OS, guest memory, a virtual CPU ("VCPU"), virtual memory devices ("VMD"), and virtual input/output devices ("VI/O"). For example, virtual machine 170A may include guest OS 196A, guest memory or virtual machine memory 195A, a virtual CPU 190A, a virtual memory devices 192A, and virtual input/output device 194A. Virtual machine memory 195A may include one or more memory pages. Similarly, virtual machine 170B may include guest OS 196B, virtual machine memory 195B, a virtual CPU 190B, a virtual memory devices 192B, and virtual input/output device 194B. Virtual machine memory 195B may include one or more memory pages.

The computing system 100 may also include a hypervisor 180 and host memory 194. Hypervisor 180 may manage host memory 184 for the host operating system 186 as well as memory allocated to the virtual machines 170A-B and guest operating systems 196A-B such as guest memory or virtual machine memory 195A-B provided to guest OS 196A-B. The hypervisor 180 may clear a valid descriptor by overwriting a valid bit with an invalid bit, deleting a special entry in a valid field, overwriting a packet address with an invalid value (e.g., a zero value or NULL value), changing a packet length to an invalid packet length, etc.

Host memory 184 and virtual machine memory 195A-B may be divided into a plurality of memory pages that are managed by the hypervisor 180. Virtual machine memory 195A-B allocated to the guest OS 196A-B may be mapped from host memory 184 such that when a guest application 198A-D uses or accesses a memory page of virtual machine memory 195A-B, the guest application 198A-D is actually using or accessing host memory 184.

In an example, a virtual machine 170A may execute a guest operating system 196A and run applications 198A-B which may utilize the underlying VCPU 190A, VMD 192A, and VI/O device 194A. One or more applications 198A-B may be running on a virtual machine 170A under the respective guest operating system 196A. A virtual machine (e.g., VM 170A-B, as illustrated in FIG. 1) may run on any type of dependent, independent, compatible, and/or incompatible applications on the underlying hardware and OS. In an example, applications (e.g., App 198A-B) run on a virtual machine 170A may be dependent on the underlying hardware and/or OS 186. In another example, applications 198A-B run on a virtual machine 170A may be independent of the underlying hardware and/or OS 186. For example, applications 198A-B run on a first virtual machine 170A may be dependent on the underlying hardware and/or OS 186 while applications (e.g., application 198C-D) run on a second virtual machine (e.g., VM 170B) are independent of the underlying hardware and/or OS 186A. Additionally, applications 198A-B run on a virtual machine 170A may be compatible with the underlying hardware and/or OS 186. In an example, applications 198A-B run on a virtual machine 170A may be incompatible with the underlying hardware and/or OS 186. For example, applications 198A-B run on one virtual machine 170A may be compatible with the underlying hardware and/or OS 186A while applications 198C-D run on another virtual machine 170B are incompatible with the underlying hardware and/or OS 186. In an example, a device may be implemented as a virtual machine (e.g., virtual machine 170A-B).

The computer system 100 may include one or more nodes 110A-C. Each node 110A-C may in turn include one or more physical processors (e.g., CPU 120A-E) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect ("PCI") device, storage devices, disk drives, sound or video adaptors, photo/video cameras, printer devices, keyboards, displays, etc. Virtual machines 170A-B may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B.

In an example, a processor associated with the guest OS (e.g., guest OS 196A-B) and a processor associated with the hypervisor 180 may be one of the other processor(s) illustrated in FIG. 1, such as a CPU (e.g., CPU 120A-E) on node 110A-C. Similarly, ring buffer 138 may be stored in a memory device, and may be one of the other memory(s) illustrated in FIG. 1, such as MD 130A-D on node 110A-C. Additionally, the processors associated with the hypervisor 180 and guest OS (e.g., guest OS 196A-B) may be different cores on the same physical processor.

The processor associated with the guest OS (e.g., guest OS 196A-B, hereinafter referred to generally as guest OS 196) may be configured to mark memory entries such as packet addresses valid for transmission. The guest OS 196 and/or associated processor may also be configured to send a request associated with a memory entry to the hypervisor 180. The request may be to transmit the memory entries marked valid for transmission, to copy the memory entries into virtual machine memory, to copy the memory entries out of virtual machine memory, etc. The hypervisor 180 and/or associated processor may be configured to detect or receive the request. The hypervisor 180 may also be configured to retrieve memory entries from the ring buffer 138 by testing descriptor values of associated with the memory entries to determine whether the slots contain memory entries with valid descriptors (e.g., memory entries marked as valid or ready for transmission). The hypervisor 180 may also be configured to execute the request (e.g., requests associated with the respective descriptors, such as transmitting a memory entry or copying the memory entry). Additionally, the hypervisor 180 may be configured to clear valid descriptors in batches, for example, by walking the ring buffer 138 backwards after retrieving memory entries from up to a predetermined quantity of slots. By clearing valid descriptors in each of the predetermined quantity of slots in batches, the hypervisor 180 prevents cache line bounces after each memory entry transmission, thereby improving performance and throughput.

It should be appreciated that when discussing the capabilities of the hypervisor 180, the hypervisor 180 may be responsible for a specific act or action or the processor associated with the hypervisor 180 may be responsible for the specific act or action. Similarly, when discussing the capabilities of the guest OS 196, it should be appreciated that either the guest OS 196 or the processor associated with the guest OS 196 may be responsible for a specific act or action.

As used herein, physical processor or processor 120A-E refers to a device capable of executing instructions encoding arithmetic, logical, and/or I/O operations. In one illustrative example, a processor may follow Von Neumann architectural model and may include an arithmetic logic unit ("ALU"), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors 120A-E may be interconnected using a variety of techniques, ranging from a point-to-point processor interconnect, to a system area network, such as an Ethernet-based network. Local connections within each node, including the connections between a processor 120A-E and a memory device 130A-D may be provided by one or more local buses of suitable architecture, for example, peripheral component interconnect ("PCI").

Figure 2A:
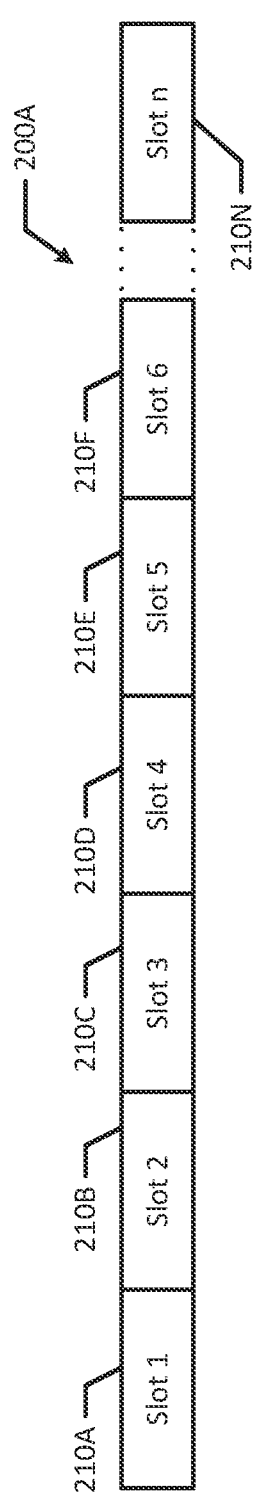
FIG. 2A illustrates a block diagram of an example memory ring according to an example embodiment of the present disclosure.
Figure 2B:
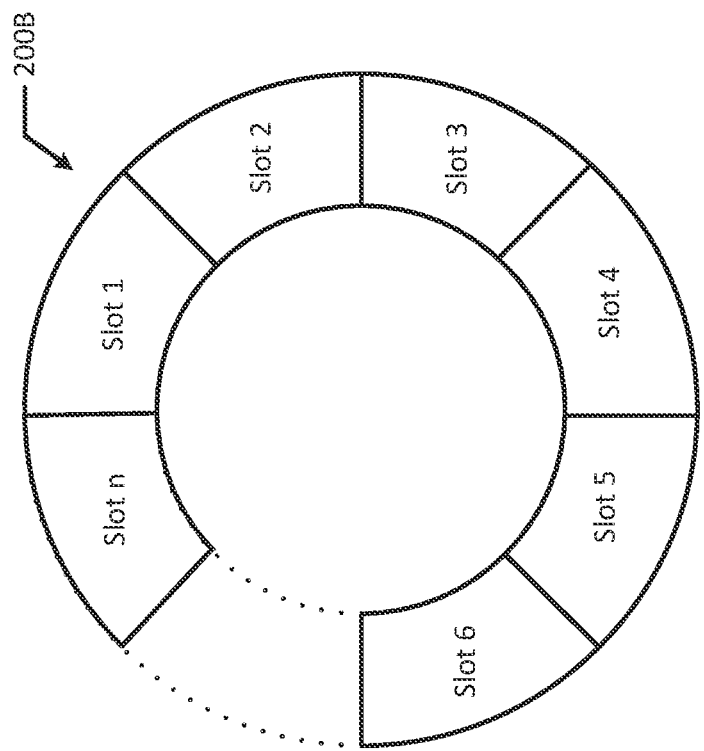
FIG. 2B illustrates a block diagram of an example memory ring according to an example embodiment of the present disclosure.

FIGS. 2A and 2B illustrate block diagrams of example ring buffers 200A and 200B. For example, FIG. 2A illustrates a linear buffer implementation of ring buffer 200A while FIG. 2B illustrates the "ring" structure of ring buffer 200B. It should be appreciated that ring buffers 200A-B may be the same actual memory structure illustrated in two different ways. Ring buffers 200A-B may in be located in cacheable memory, such as L1 cache if on the same physical processor but on different CPU cores. In another example, the ring buffer 200A-B may be on a different level of cache other than L1. Additionally, ring buffers 200A-B may include a plurality of slots (e.g., slots 210A-N). For example, slots 210A-N may correspond to Slot_1 to Slot_n respectively. Each slot may include a memory entry, such as a data packet, a packet address, an entry pointer, or the like. Additionally, each slot or entry may be associated with a descriptor or descriptor value. Slots may be empty or may include a cleared o invalid descriptor value, such as "0". For example, a slot with a memory address of "0" may be used to indicate an entry with a cleared descriptor. Slots with a valid descriptor value may include a memory entry with a non-zero address or non-zero packet length, such as an entry pointer to a data packet or a packet address. Additionally, a valid descriptor may be a valid bit or a special value in a field entry associated with the memory entry.

Figure 3:
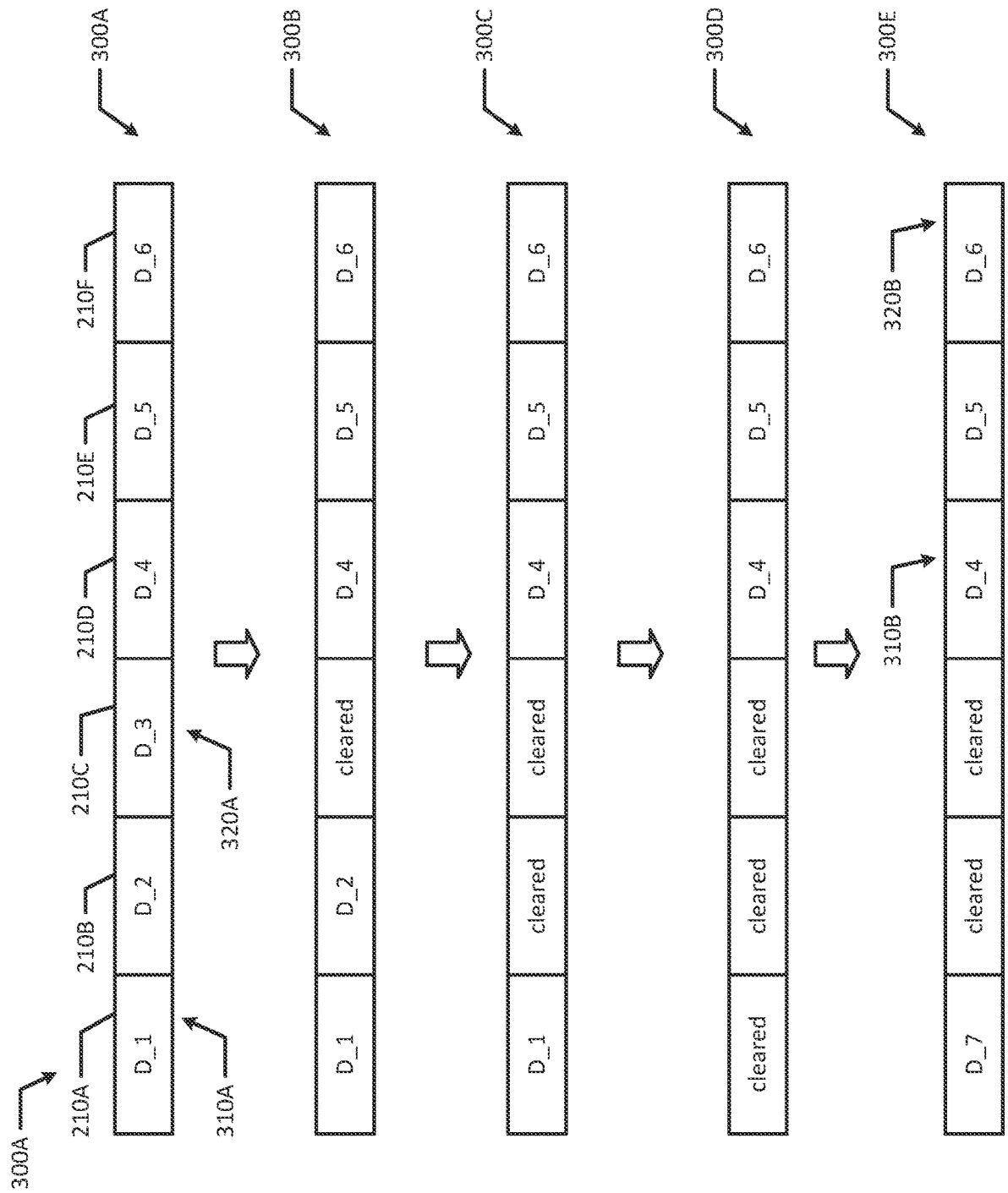
FIG. 3 illustrates a block diagram of reverse order queue updates of an example memory ring.

FIG. 3 illustrates a block diagram of reverse order queue updates by virtual devices of an example memory ring, such as ring buffer 138 or 300A-B. For example, memory ring 300 is illustrated as 300A-E, which represent different states of memory ring 300 at different points in time. Memory ring or ring buffer 300 may include six slots (e.g., slots 210A-F). In an example, each slot may include a memory entry associated with a descriptor, such as descriptors D_1 to D_6. As illustrated in ring buffer 300A, a first slot (e.g., slot 210A) includes descriptor D_1, slot 210B includes descriptor D_2, slot 210C includes descriptor D_3, slot 210D includes descriptor D_4, slot 210E includes descriptor D_5, and slot 210F includes descriptor D_6. Descriptors may be written into or marked as valid in the memory ring or ring buffer 300 by a guest OS, such as guest OS 196A-B. Additionally, ring buffer 300A may include an index or pointer designating an original slot 310A and an end slot 320A. In an example, the index may be a registry. A hypervisor 180 may retrieve and transmit memory entries, such as packet addresses from a predetermined quantity of slots (e.g., slots 210A-C). After retrieving the packet addresses, the hypervisor 180 may clear the valid descriptors associated with the group of slots (e.g., slots 210A-C).

As illustrated by ring buffers 300B-D, the hypervisor 180 may walk the ring 300 backwards and clear the valid descriptor in each slot from the end slot 320A to the original slot 310A. For example, the hypervisor 180 may clear the valid descriptor in slot 210C by writing an invalid value into descriptor associated with that slot. Then, the hypervisor 180 may clear the valid descriptor in slot 210B. Similarly, hypervisor 180 may clear the valid descriptor associated with the original slot 310A (e.g., slot 210A) by writing or storing an invalid value in the descriptor associated with slot 210A. After the valid descriptor in each slot (e.g., slot 210A-C) has been cleared, the consumer pointer is positioned at a new original slot 310B (e.g., slot 210D with descriptor D_4), as illustrated in ring buffer 300E. Similar to the reverse order queue updates described above for slots 210A-C, the hypervisor 180 may proceed completing additional requests, such as copying or transmitting packets, from the new original slot 310B to a new end slot 320B. Once the hypervisor 180 has cleared the valid descriptors in the slots, the guest OS (e.g., guest OS 196A-B) may store additional memory entries and mark the descriptors as valid for transmission, such as packet address D_7 into ring buffer 300. For example, the guest OS 196 may store a new packet and mark the descriptor D_7 in slot 210A as valid for transmission after the hypervisor 180 is done accessing the cache line for slot 210A, which advantageously reduces the frequency of cache line bounces between the hypervisor 180 and guest OS 196. For example, the hypervisor 180 retrieves multiple memory entries before clearing the valid descriptors associated with any of the entries, thereby holding back the guest OS and advantageously preventing the frequency of cache line bounces without increasing ring size.

As illustrated in FIG. 3, the predetermined quantity of memory entries or slots is three, however, other predetermined quantities may be used. For example, the predetermined quantity may be two, four, ten, etc. In an example, the predetermined quantity may be associated with the size of the ring buffer 138. For example, the predetermined quantity may be a fraction of the size of the ring buffer 138 (e.g., 1/16 of a ring, 1/8 of a ring, or 1/4 of a ring). In an example, if the predetermined quantity is 1/16 of a ring buffer with 128 slots, then the predetermined quantity may be eight slots. Similarly, the predetermined quantity may also be related to the quantity of cache lines used by the ring buffer 138. For example, if the ring buffer 138 uses four cache lines (e.g., 32 slot ring buffer where each slot is 8 bytes and four cache lines of 64 bytes), then the predetermined quantity of slots or memory entries may be the quantity of slots or memory entries dedicated to a single cache line (e.g., 8 slots), which may advantageously prevent cache line bounces between the guest OS 196 and the hypervisor 180 because each processor associated with the guest OS 196 and hypervisor 180 may be accessing different cache lines. For example, after the hypervisor 180 completes or executes a request (e.g., copies or transmits memory entries and clears the valid descriptor associated with the predetermined quantity of memory entries in a first cache line, it may start executing additional request (e.g., transmit memory entries) associated with additional slots in a different cache line (e.g., second cache line) as the guest OS 196 is marking new data packets as valid for transmission in slots in the first cache line, thereby allowing the guest OS 196 and the hypervisor 180 to simultaneously execute memory operations in separate cache lines.

Figure 4:
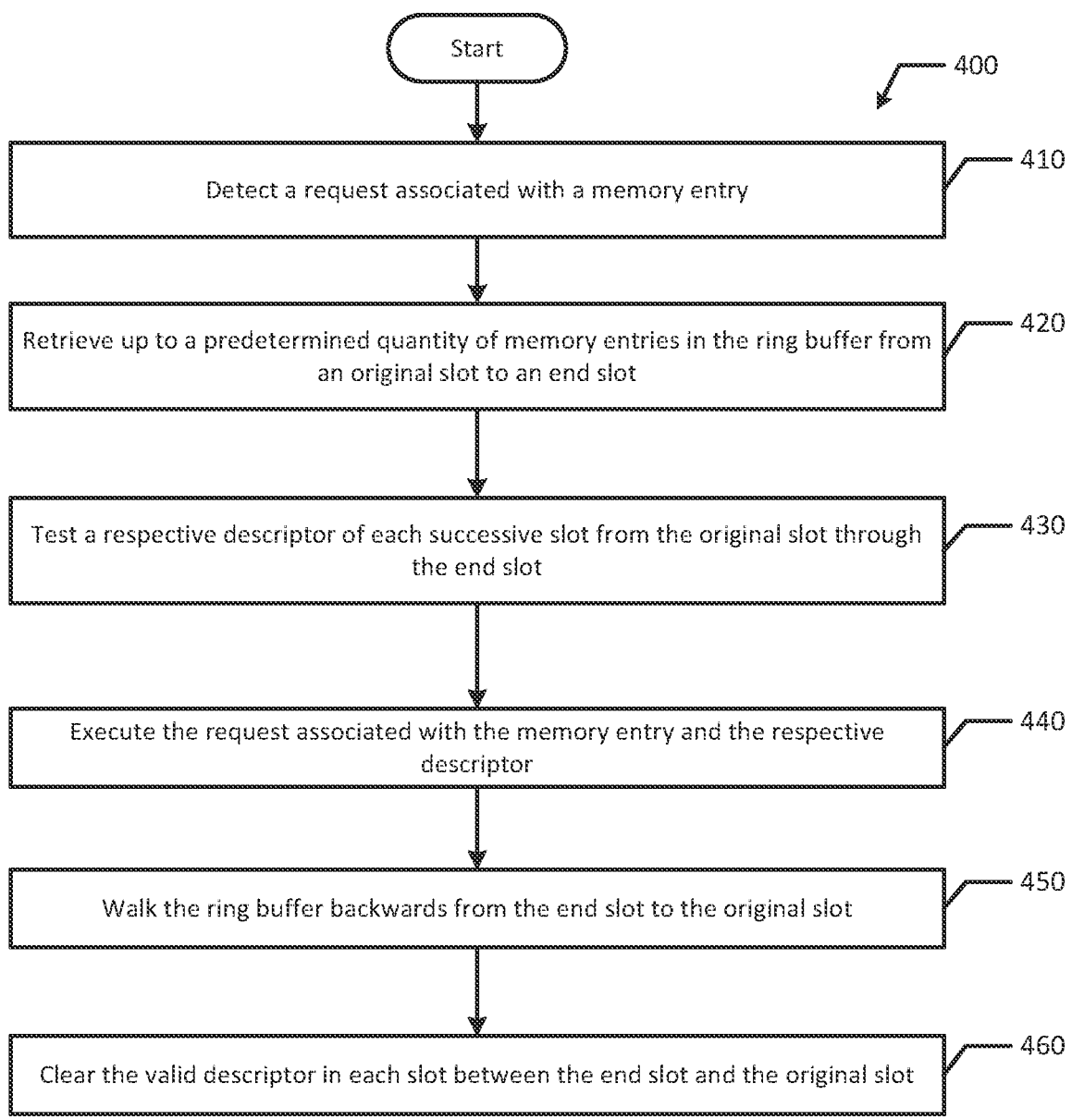
FIG. 4 illustrates a flowchart of an example process for reverse order queue updates by virtual devices according to an example embodiment of the present disclosure.

FIG. 4 illustrates a flowchart of an example method 400 for reverse order queue updates according to an example embodiment of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both.

The example method 400 includes detecting a request associated with a memory entry (block 410). For example, a hypervisor 180 may detect a request to transmit (e.g., copy) at least one memory entry from a ring buffer 138 to a second memory, such as virtual machine memory 195A. The request may also be to copy the memory entry out of a memory, such as virtual machine memory 195A. In an example, the hypervisor 180 may detect the request after a guest OS 196 validates additional memory entries in the ring buffer 138 as valid for transmission. For example, the hypervisor 180 may detect the request after a predetermined quantity of memory entries has been added to the ring buffer 138 and marked as valid for transmission. Additionally, the hypervisor 180 may detect the request from a virtual machine (e.g., VM 170A-B) or from the destination. For example, a NIC at the destination may notify the hypervisor 180 that it is ready for more memory entries to be transmitted. Then, the method includes retrieving up to a predetermined quantity of memory entries in the ring buffer from an original slot to an end slot (block 420). For example, after the hypervisor 180 detects the request, the hypervisor 180 may retrieve up to a predetermined quantity of memory entries in the ring buffer 138 from an original slot 310A to an end slot 320A. For example, if the predetermined quantity is three memory entries or three slots, then the hypervisor 180 may retrieve up to three memory entries from the ring buffer 138. If some of the predetermined quantity of memory entries include previously cleared descriptor or are empty (e.g., do not have a memory entry associated with the slot), the hypervisor 180 may retrieve less than three memory entries from the ring buffer 138. For example, the hypervisor 180 may advantageously retrieve and copy less than the predetermined quantity to increase efficiency and reduce downtime associated with waiting for additional packets to be produced and marked as valid for transmission by the guest OS 196, which may cause undue delays when there is a slowdown of incoming network traffic.

In an example, the hypervisor 180 may be paused or may wait before attempting to execute additional requests (e.g., copy or transmit additional packets). For example, after testing a slot and receiving or reading a previously cleared or an invalid descriptor value, a timer may start and count up to a predetermined timespan (e.g., 25 milliseconds, one second, 20 seconds) before the hypervisor 180 attempts to execute additional requests. In another example, a counter may be used to count memory entries marked as valid for transmission, such as packets validated by guest OS 196, and the hypervisor 180 may start executing requests after the counter reaches a threshold quantity of packets. In another example, the hypervisor 180 may pause after testing a slot with a previously cleared descriptor or an invalid descriptor value until it receives an additional request to transmit memory entries from the guest OS 196.

The method also includes testing a respective descriptor of each successive slot from the original slot through the end slot (block 430). For example, the hypervisor 180 may test a respective descriptor of each successive slot from the original slot through the end slot while the respective descriptor of each successive slot in the ring buffer 138 remains unchanged. In an example, each respective descriptor is associated with a corresponding respective memory entry in each respective successive slot. If a test on the third slot returns an invalid descriptor value, the hypervisor 180 may retrieve memory entries from the first and second slots (e.g., less than the predetermined quantity of three slots). For example, a value of "0" stored in the descriptor may indicate that the remainder of the ring buffer 138 is empty or that the remainder of the ring buffer 138 has been previously transmitted by the hypervisor 180, which may prompt the hypervisor 180 to retrieve less than the predetermined quantity. Additionally, the hypervisor 180 may stop testing descriptors responsive to receiving a value other than a valid descriptor, such as an invalid value from one of the successive slots from the original slot 310A through the end slot 320A. Alternatively, if an invalid value is not received, the hypervisor 180 may stop testing responsive to retrieving a predetermined quantity of memory entries in the ring buffer 138.

Then, the method continues with executing the request associated with the memory entry and the respective descriptor (block 440). For example, responsive to determining the respective descriptor is a valid descriptor, the hypervisor 180 may execute a request associated with the respective descriptor. In an example, the request may be a request to transmit the respective memory entry from a first memory to a second memory and the hypervisor may record and/or copy the respective value in the second memory, such as virtual machine memory 195A. In an example, a valid value may be a valid bit, a special value in the field entry, a non-zero address, or a non-zero packet length.

Next, the method includes walking the ring buffer backwards from the end slot to the original slot (block 450). For example, the hypervisor 180 may successively walk the ring buffer 138 backwards from the end slot 320 (e.g., slot_3) to an intermediate slot 315 (e.g., slot_2) and then back to the original slot 310A (e.g., slot_1). In an example, walking the ring buffer 138 backwards may include counting the quantity of memory entries as the memory entries are retrieved by the hypervisor 180, thereby documenting the quantity of slots the hypervisor 180 needs to walk back to. Additionally, walking the ring buffer 138 backwards may include decrementing a counter while walking backwards. For example, the hypervisor 180 may decrement a counter for each slot that the hypervisor 180 walks back to until the hypervisor 180 determines that it reaches the original slot.

Then, the method includes clearing the valid descriptor in each slot between the end slot and the original slot (block 460). For example, while waking the ring buffer 138 backwards, the hypervisor 180 may clear the valid descriptor in each slot between the end slot 320A to the original slot 310A including both the end slot 320A and the original slot 310A. Clearing the valid descriptor in each slot between the end slot 320A and original slot 310A may result in clearing the valid descriptor in the intermediate slots between the end slot 320A and the original slot 310A or any combination of the intermediate slots, the end slot 320A and/or the original slot 310A. For example, referring back to FIG. 3, clearing the valid descriptor in each slot between the end slot 320A and the end slot 310A may result in clearing the valid descriptor in slots 210A-C, slots 210A-B, slots 210B-C, or slot 210B for example, based on a particular system configuration. In an example, multiple clearing steps may occur iteratively after retrieving a predetermined quantity of memory entries or reading a descriptor value other than a valid value in a slot. For example, multiple clearing steps may occur to first clear valid descriptors in slots 210A-B and then to clear a valid descriptor in slot 210C.

In an example, clearing a valid descriptor in each slot may include overwriting each descriptor with an invalid value. For example, clearing a valid descriptor may include storing a "0" value in the slot as the packet address. Clearing a valid descriptor may also include overwriting a valid bit with an invalid bit, deleting a special entry in a valid field, changing a packet length to an invalid packet length, etc. By clearing the valid descriptors in each slot in a batch all together instead of after each retrieval, the guest OS 196 is advantageously held back from accessing the ring buffer 138 (e.g., cache line associated with a slot in the ring buffer 138), which reduces the frequency and/or occurrence of a cache line bounce. For example, depending on the predetermined quantity used and the ring size, the guest OS 196 and hypervisor 180 may be accessing slots that are far enough away from each other (e.g., in different cache lines) such that neither is accessing the same cache line at the same time. For example, a cache line may be 64 bytes, and a slot may be 8 bytes, thus a ring buffer 138 may take up multiple cache lines. If the guest OS 196 and the hypervisor 180 are performing memory operations on entries in slots that are positioned more than eight slots away from each other in the above example, the guest OS 196 and the hypervisor 180 may be utilizing different cache lines. Accordingly, in this example, the predetermined quantity may be eight or more so the respective cache lines used by the guest OS 196 and the hypervisor 180 may not overlap thereby avoiding or minimizing cache line bounces.

After the descriptor in the original slot is cleared, a cache line may bounce between the processor associated with the hypervisor 180 and the processor associated with the guest OS 196. For example, while the hypervisor 180 is accessing the ring buffer 138, the hypervisor 180 may access the cache line for the ring buffer 138. However, when the guest OS 196 needs to access the memory for the ring buffer 138, the guest OS 196 may request access to the cache line to determine the current state of the ring buffer 138 (e.g., what memory entries are present in the ring buffer 138), thereby causing a cache line bounce which may slow down the process of forwarding network traffic (e.g., data packets).

In an example, a cache line may be 64 bytes wide. When either the hypervisor 180 or guest OS 196 needs to access a slot in the ring buffer 138, the hypervisor 180 and/or guest OS 196 may check for a corresponding entry in the cache. For example, the cache may check for the contents of the requested memory location (e.g., ring slot) in any cache lines that may contain the address.

Figure 5:
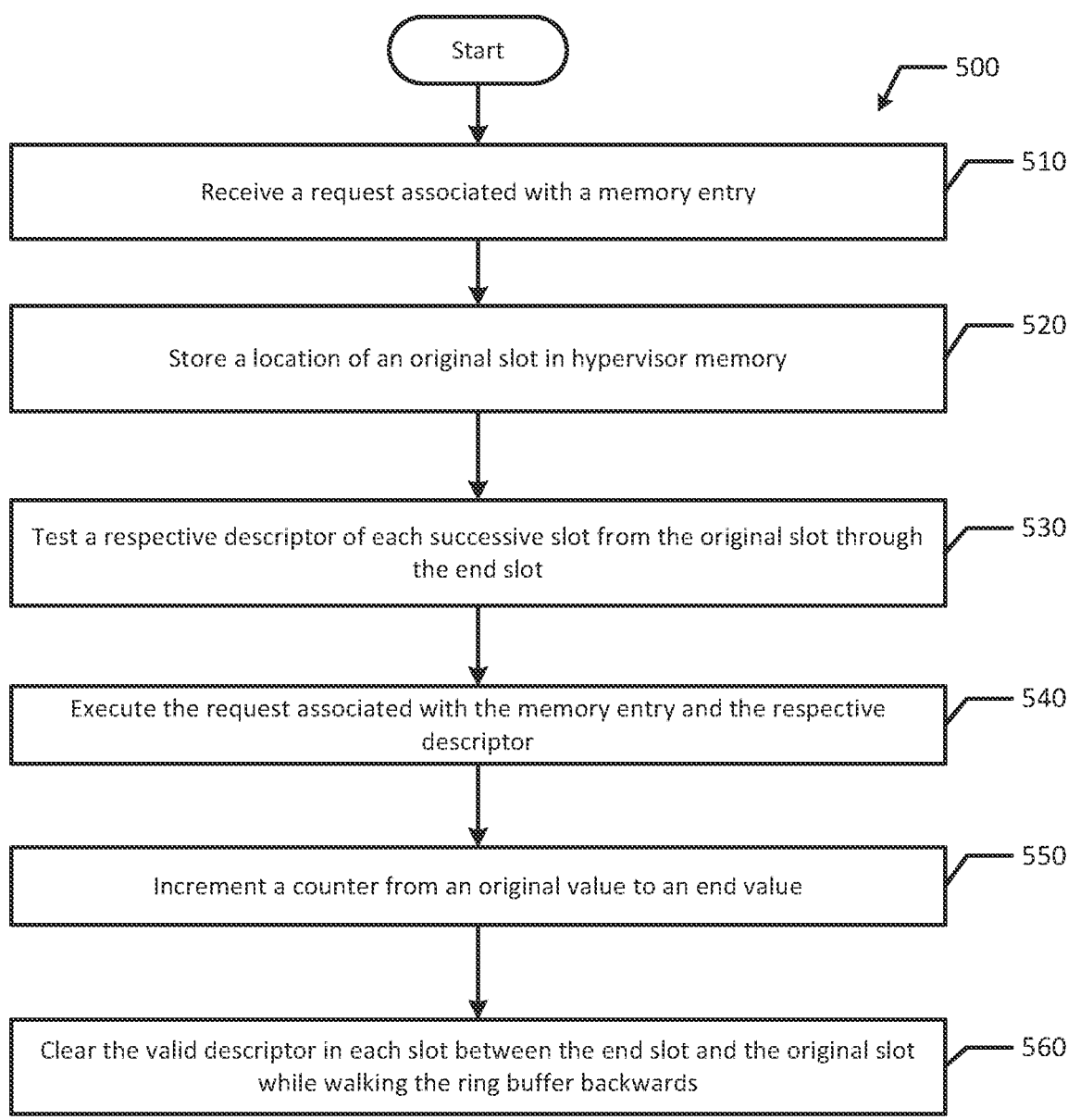
FIG. 5 illustrates a flowchart of an example process for reverse order queue updates by virtual devices according to an example embodiment of the present disclosure.

FIG. 5 illustrates a flowchart of an example method 500 for reverse order queue updates according to an example embodiment of the present disclosure. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may comprise hardware (circuitry, dedicated logic, etc.), software, or a combination of both.

The example method 500 includes receiving a request associated with a memory entry (block 510). For example, a hypervisor 180 may receive a request to transmit at least one memory entry from a ring buffer 138 to a second memory, a request to copy the at least one memory entry into virtual machine memory, or a request to copy the respective memory entry out of virtual machine memory, such as virtual machine memory 195A. The hypervisor 180 may receive the request from a virtual machine (e.g., VM 170A-B), a guest OS 196, or from a device associated with the destination. For example, a NIC at the destination may notify the hypervisor 180 that it is ready for more memory entries to be transmitted. Then, the method includes storing a location of an original slot in hypervisor memory (block 520). For example, after the hypervisor 180 receives the request, the hypervisor 180 may determine and store the location of a starting location or original slot that hypervisor 180 starts at when processing the request. In an example, the original slot may be indicated by a pointer.

The method also includes testing a respective descriptor of each successive slot from the original slot through the end slot (block 530). For example, the hypervisor 180 may test a respective descriptor of each successive slot from the original slot through the end slot while the respective descriptor of each successive slot in the ring buffer 138 remains unchanged. In an example, each respective descriptor is associated with a corresponding respective memory entry. The hypervisor 180 may test respective descriptors to determine if the descriptor is a valid descriptor (e.g., a valid bit, a special value in the field entry, a non-zero address, or a non-zero packet length) or if the descriptor has already been cleared or is invalid (e.g., an invalid bit, a deleted or empty valid field value, a packet address with a zero value or NULL value, or an invalid packet length).

Then, the method continues with executing the request associated with the memory entry and the respective descriptor (block 540). For example, responsive to determining the respective descriptor is a valid descriptor, the hypervisor 180 may execute the request associated with the memory entry and/or the respective descriptor. In an example, the request may be a transmission request or a copy request to transmit/copy the respective memory entry from the first memory to the second memory and the hypervisor may record and/or copy the respective value in the second memory, such as virtual machine memory 195A.

The method also includes incrementing a counter from an original value to an end value (block 550). For example, responsive to executing the requests associated with each of the respective descriptors in the original slot through the end slot, the hypervisor may increment a counter from an original value to an end value. The original value may be "0" and the hypervisor 180 may increment the counter from "0" to "1" as the hypervisor transmits a packet from slot_1 and may increment the counter from "1" to "2" after transmitting a packet from slot_2. Similarly, the hypervisor may incremented the counter from "2" to "3" after transmitting a packet from slot_3.

Then, the method includes clearing the valid descriptor in each slot between the end slot and the original slot while walking the ring buffer backwards (block 560). For example, while waking the ring buffer 138 backwards, the hypervisor 180 may clear the valid descriptor in each slot between the end slot 320A to the original slot 310A including both the end slot 320A and the original slot 310A. Specifically, the hypervisor 180 may successively walk the ring buffer 138 backwards from the end slot 320 (e.g., slot_3) to an intermediate slot 315 (e.g., slot_2) and then back to the original slot 310A (e.g., slot_1) while clearing valid descriptor values. Additionally, the hypervisor 180 may decrement the counter from the end value (e.g., "3") to the original value (e.g., "0") for each slot that the hypervisor 180 walks back to. The hypervisor 180 may decrement the counter from "3" to "2" as the hypervisor walks back from slot_3 to slot_2, decrement the counter to "1" when walking back from slot_2, and decrement the counter to "0" when reaching slot_1. When the counter value reaches the original value, the hypervisor 180 may determine that it has the original slot.

Figure 6A:
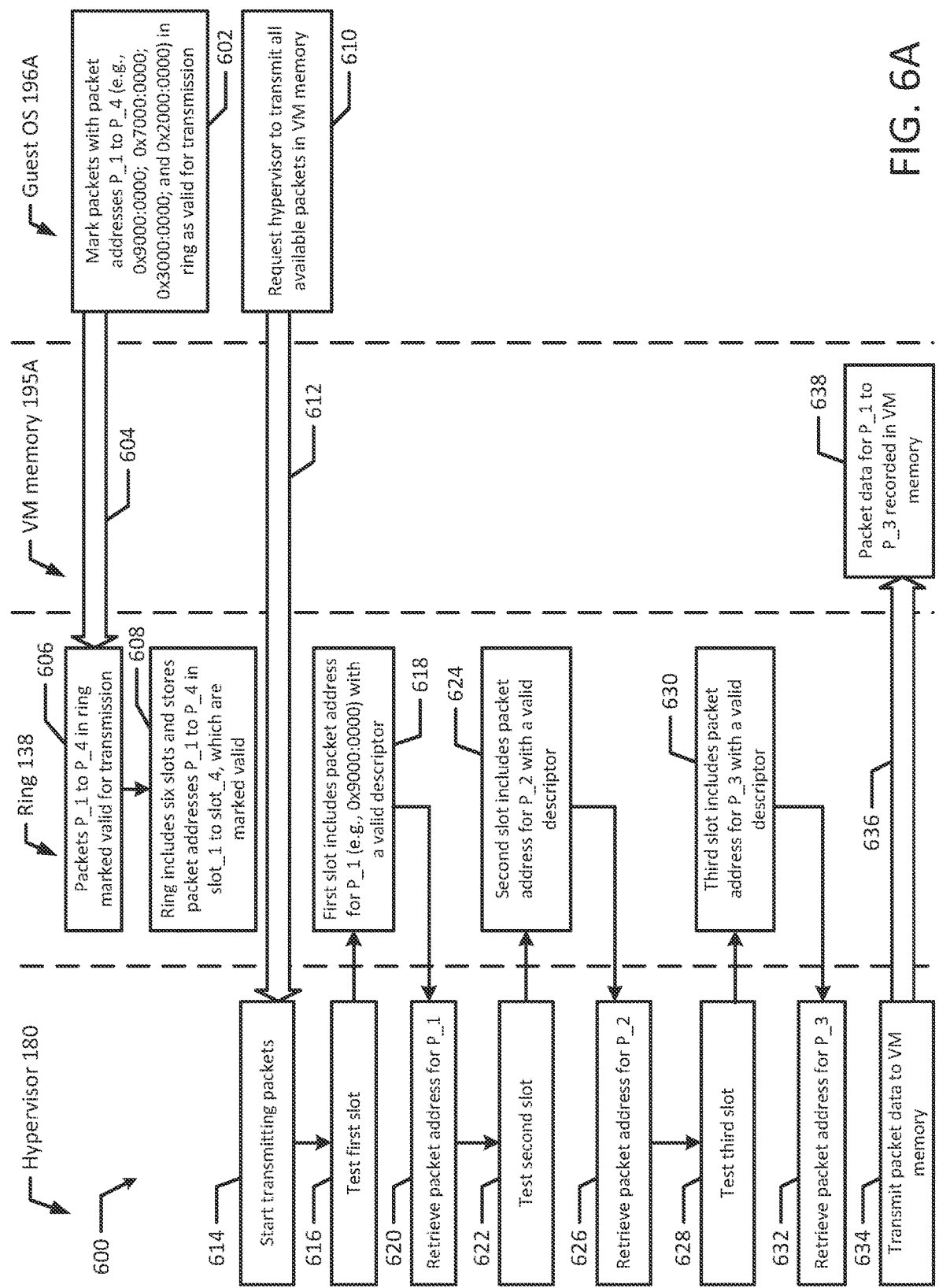
FIGS. 6A and 6B illustrate a flow diagram of an example process for reverse order queue updates by virtual devices according to an example embodiment of the present disclosure.
Figure 6B:
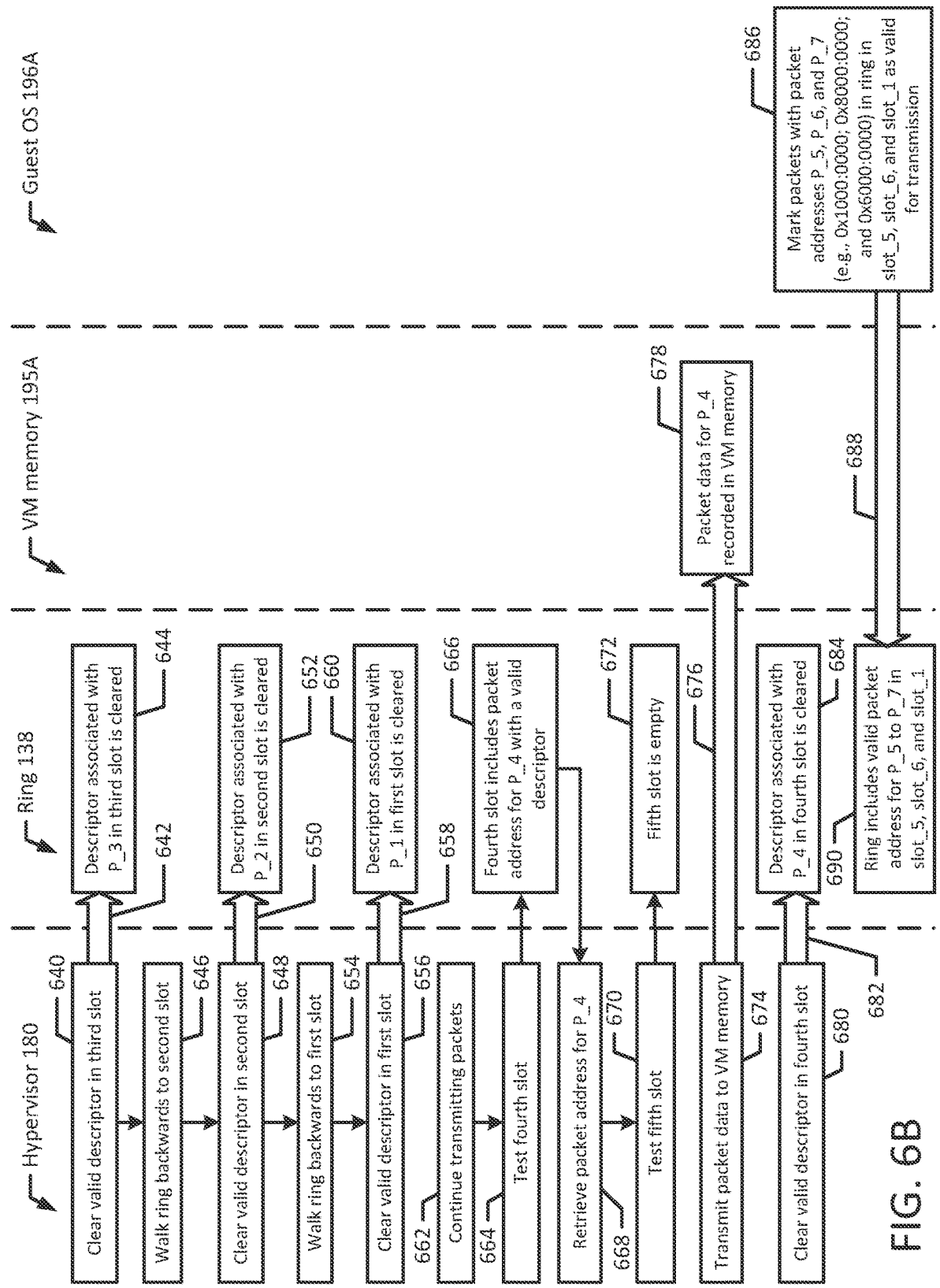

FIGS. 6A and 6B illustrate a flowchart of an example method 600 for reverse order queue updates by virtual devices in accordance with an example embodiment of the present disclosure. Although the example method 600 is described with reference to the flowchart illustrated in FIGS. 6A and 6B, it will be appreciated that many other methods of performing the acts associated with the method 600 may be used. For example, the order of some of the blocks may be changed, certain blocks may be combined with other blocks, and some of the blocks described are optional. For example, a hypervisor 180 and a guest OS 196A may communicate with a ring buffer 138 and virtual machine memory 195A to perform example method 600.

In the illustrated example, the guest OS 196A may mark packets with packet addresses P_1 to P_4 in ring buffer 138 as valid for transmission (blocks 602 and 604). For example, the guest OS 196A may mark packet addresses 0.x9000:0000, 0x7000:0000, 0x3000:0000, and 0x2000:0000 corresponding to packet address P_1 to P_4 in four slots in the ring buffer 138 (e.g., first slot to fourth slot) as valid by assigning a valid bit in each descriptor associated with packets P_1 to P_4. Then, each of the packet addresses P_1 to P_4 in ring buffer 138 are marked as valid for transmission (block 606). For example, packet addresses P_1 to P_4 may be associated with a valid bit indicating the packets are ready for transmission in the ring buffer 138. In an example, packet addresses P_1 to P_4 may be marked as valid for transmission by writing a valid bit into a field entry associated with each memory entry. In the illustrated example, the ring 138 includes six slots and stores packet addresses P_1 to P_4 in slot_1 to slot_4 (marked valid for transmission) while slot_5 and slot_6 are empty (block 608). In the illustrated example, an empty slot may not have a memory entry stored in the slot or may include an invalid memory entry stored in the slot. For example, the slots may have previously been overwritten with a packet address with a zero value, or the slot may have been overwritten with an invalid packet length.

Then, the guest OS 196A may request the hypervisor 180 to transmit all available packets in VM memory 195A (blocks 610 and 612). For example, the guest OS 196A may forward incoming network traffic to a virtual machine (e.g., VM 170A) by marking packet addresses for the incoming network traffic in the ring buffer 138 as valid for transmission and requesting the hypervisor 180 to transmit the available packets (via the packet addresses) from the ring buffer into VM memory 195A. The hypervisor 180 may start transmitting packets (block 614). In an example, the hypervisor 180 may start transmitting packets (e.g., packet addresses) after receiving the request from the guest OS 196A. Additionally, the hypervisor 180 may detect the request from the guest OS 196A.

The hypervisor 180 may test the first slot (block 616). For example, the hypervisor 180 may test the descriptor in slot_1 to determine whether the descriptor associated with the memory entry or packet address in the slot is a valid descriptor. In the illustrated example, the first slot includes a packet address for P_1 (e.g., 0x9000:0000) with a valid descriptor (block 618). For example, the hypervisor 180 may read the packet address 0x9000:0000 in slot_1 while testing the descriptor to determine that the packet address 0x9000:0000 in the first slot includes a valid descriptor and is ready for transmission. Then, the hypervisor 180 may retrieve the packet address for P_1 (block 620). In an example, the hypervisor 180 may store the packet address for P_1 in a temporary memory location, which may later be copied to VM memory 195A.

After testing descriptor in the first slot, the hypervisor 180 may test the second slot (block 622). For example, the hypervisor 180 may test the descriptor in slot_2 to determine whether the descriptor associated with the memory entry or packet address in the slot is a valid descriptor. In the illustrated example, the second slot includes a packet address for P_2 (e.g., 0x7000:0000) with a valid descriptor (block 624). For example, the hypervisor 180 may read the packet address 0x7000:0000 in slot_2 while testing the descriptor to determine that the packet address 0x7000:0000 in the second slot includes a valid descriptor and is ready for transmission. Then, the hypervisor 180 may retrieve the packet address for P_2 (block 626). Similar to P_1, the packet address for P_2 may also be stored in a temporary memory location.

After testing the second slot, the hypervisor 180 may test the third slot (block 628). For example, the consumer hypervisor 180 may test the descriptor in slot_3 to determine whether the descriptor associated with the memory entry or packet address in the slot is a valid descriptor. In the illustrated example, the third slot includes a packet address for P_3 (e.g., 0x3000:0000) with a valid descriptor (block 630). For example, the hypervisor 180 may read slot_3 while testing the descriptor to determine that the third slot includes a packet address of 0x3000:0000 with an associated valid descriptor (e.g., the packet P_3 is ready for transmission). Then, the hypervisor 180 may retrieve the packet address for P_3 (block 632). As discussed above, the packet address (e.g., packet address for P_3) may be stored in a temporary memory location by the hypervisor 180.

Then, the consumer hypervisor 180 may transmit packet data to VM memory 195A (blocks 634 and 636). For example, the hypervisor 180 may copy the data packets associated with the packet addresses P_1 to P_3 to VM memory 195A. In an example, the packet data may be copied to VM memory 195A from a temporary memory location. Then, packet data for P_1 to P_3 is recorded in VM memory 195A (block 638). In an example, packet data for P_1 to P_3 may be copied to VM memory 195A in a batch. Additionally, packet data for P_1 to P_3 may be copied to VM memory 195A sequentially as each packet address is retrieved by the hypervisor 180.

Continuing on FIG. 6B, after transmitting a predetermined quantity of packet address from the ring buffer 138, the hypervisor 180 may clear the valid descriptor in the third slot (blocks 640 and 642). For example, the hypervisor 180 may walk the ring buffer 138 backwards from slot_3 to slot_1 and may invalidate slots sequentially from slot_3 to slot_1. Specifically, the descriptor associated with packet address P_3 in the third slot is cleared (block 644). For example, the descriptor in slot_3 in the ring buffer 138 is cleared or invalidated (e.g., replaced with an invalid bit), which enables slot_3 to be used by the guest OS 196A in the future for additional network traffic data packets. After clearing the descriptor in the third slot, the hypervisor 180 may walk the ring buffer backwards to the second slot (block 646). For example, the hypervisor 180 may execute a walk function to walk the ring buffer 138. Then, the hypervisor 180 may clear the valid descriptor in the second slot (blocks 648 and 650). In an example, a descriptor may be cleared by overwriting the descriptor with a value of "0". The descriptor associated with the packet address P_2 in the second slot is cleared (block 652). For example, the descriptor in slot_2 in the ring buffer 138 is cleared, which enables slot_2 to be used by the guest OS 196A for additional network traffic data packets. After clearing the descriptor in the second slot, the hypervisor 180 may walk the ring buffer 138 backwards to the first slot (block 654). For example, the hypervisor 180 may execute a walk function to walk the ring buffer 138. Then, the hypervisor 180 may clear the valid descriptor in the first slot (blocks 656 and 658). The descriptor associated with P_1 in the first slot is cleared (block 660). For example, the descriptor in slot_1 in the ring buffer 138 is cleared, which enables slot_1 to be used by the guest OS 196A for additional network traffic data packets. Clearing the descriptors in batches or groups advantageously improves performance and throughput without increasing ring size, especially when a driver is highly optimized and transmitting packets is slower than receiving packets and/or validating packets for transmission.

After clearing the descriptors in the slots, the hypervisor 180 may continue transmitting packets (block 662). For example, the hypervisor 180 may continue to transmit packets until all available packets have been transmitted to VM memory 195A. The hypervisor 180 may test the fourth slot (block 664). For example, the hypervisor 180 may test the descriptor in slot_4 to determine whether the descriptor associated with the memory entry or packet address in the slot is a valid descriptor. In the illustrated example, the fourth slot includes a packet address for P_4 (e.g., 0x2000:0000) with a valid descriptor (block 666). For example, the hypervisor may read slot_4 while testing the descriptor in the fourth slot to determine that the fourth slot includes a packet address of 0x2000:0000 with an associated valid descriptor (e.g., the packet P_4 is ready for transmission). Then, the hypervisor may retrieve the packet address for P_4 (block 668). In an example, the hypervisor 180 may store the packet address for P_4 in a temporary memory location.

After testing the fourth slot, the hypervisor 180 may test the fifth slot (block 670). For example, the hypervisor may test slot_5 to determine whether a descriptor associated with slot_5 is a valid descriptor. In the illustrated example, the fifth slot is empty and does not include a valid descriptor (block 672). For example, the hypervisor 180 may read slot_5 while testing a descriptor associated with the slot to determine that the fifth slot is empty (e.g., slot includes a packet address of "0") and thus does not have a valid descriptor. Upon receiving a value other than a valid descriptor value, the consumer hypervisor 180 may stop testing slots and/or descriptors associated with the slots. For example, an invalid value may indicate that the remainder of the ring buffer 138 is empty and that there are currently no additional packets to transmit to VM memory 195.

Then, the hypervisor 180 transmits packet data to VM memory 195A (blocks 674 and 676). For example, the hypervisor 180 may copy the data packet associated with the packet addresses P_4 to VM memory 195A. In an example, the packet data may be copied to VM memory 195A from a temporary memory location. Then, packet data for P_4 is recorded in VM memory 195A (block 678). In an example, packet data for P_4 may be copied to VM memory 195A as the packet address is retrieved by the hypervisor 180.

Then, the consumer hypervisor 180 may clear the valid descriptor in the fourth slot (blocks 680 and 682). The descriptor associated with P_4 in the fourth slot is cleared (block 684). For example, the descriptor in slot_4 in the ring buffer 138 may be cleared by overwriting the descriptor with an invalid value, which enables slot_4 to be used by the guest OS 196A for additional network traffic data packets. After the hypervisor 180 has transmitted the requested packets, the guest OS 196A may mark newly produced packets with packet addresses P_5, P_6, and P_7 in the ring buffer 138 at slot_5, slot_6, and slot_1 as valid for transmission (blocks 686 and 688). For example, the guest OS 196A may mark packet addresses 0.x1000:0000, 0x8000: 0000, and 0x6000:0000 corresponding to packet address P_5 to P_7 in three slots in the ring buffer 138 (e.g., fourth slot to first slot) as valid for transmission. In the illustrated example, the ring buffer 138 includes six slots, and the packet address for P_7 is written into the slot previously occupied by packet address P_1 because that packet's descriptor was cleared by the hypervisor 180. Then, the ring buffer or ring 138 includes packet addresses P_5 to P_7 marked as valid for transmission (block 690). After marking the additional packet addresses as valid for transmission, the guest OS 196A may send additional requests to the hypervisor 180 to transmit available packets into VM memory 195A.

Figure 7:
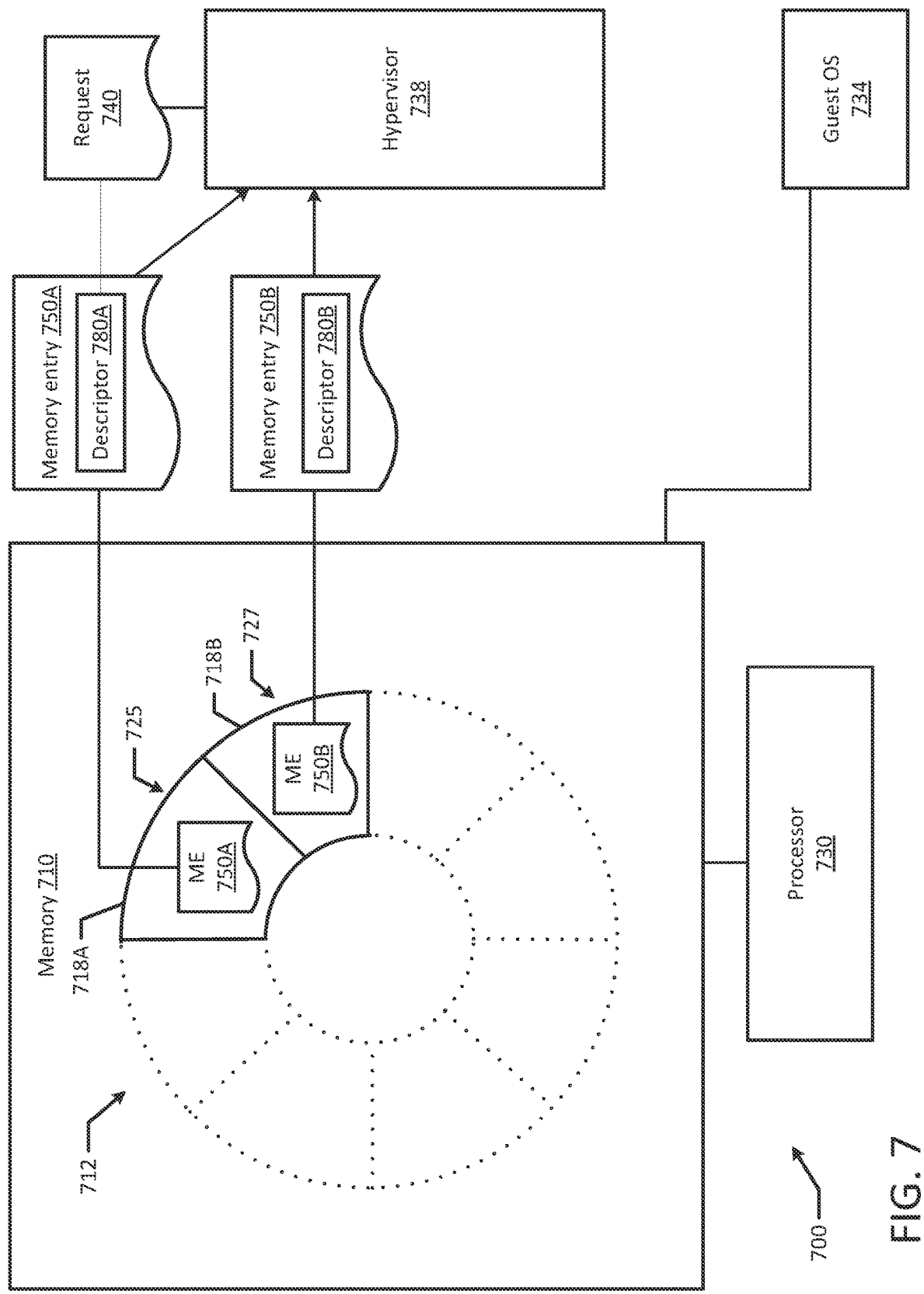
FIG. 7 illustrates a block diagram of an example reverse order queue update system according to an example embodiment of the present disclosure.

FIG. 7 is a block diagram of an example reverse order queue update system 700 according to an example embodiment of the present disclosure. The reverse slot invalidation system 700 includes a memory 710 including a ring buffer 712 having a plurality of slots 718A-B. The ring buffer 712 may have any appropriate number of slots, which may vary depending on application. The system 700 may also include a processor 730 in communication with the memory 710, a guest operating system 734, and a hypervisor 738. The hypervisor 738 is configured to detect a request 740 associated with a memory entry 750A, retrieve up to a predetermined quantity (e.g., two) of memory entries 750A-B in the ring buffer 712 from an original slot 725 (e.g., slot 718A) to an end slot 727 (e.g., slot 718B), and test a respective descriptor (e.g., descriptors 780A-B) of each successive slot (e.g., slots 718A-B) from the original slot 725 through the end slot 727 while the respective descriptor (e.g., descriptors 780A-B) of each successive slot (e.g., slots 718A-B) in the ring buffer 712 remains unchanged. Each respective descriptor (e.g., descriptors 780A-B) is associated with a corresponding respective memory entry (e.g., memory entries 750A-B) in each respective successive slot (e.g., slots 718A-B) from the original slot 725 through the end slot 727. Additionally, the hypervisor 738 is configured to execute the request 740 associated with the memory entry 750A and the respective descriptor 780A responsive to determining the respective descriptor 780A is a valid descriptor. The hypervisor 738 is also configured to walk the ring buffer 712 backwards from the end slot 727 to the original slot 725 and clear the valid descriptor (e.g., descriptors 780A-B) in each slot (e.g., slots 718A-B) between the end slot 727 and the original slot 725.

Instead of a cache line constantly bouncing between the guest OS 734 and hypervisor 738, the hypervisor 738 advantageously retrieves and transmits up to a predetermined quantity (e.g., 2, 3, 8, 16) of memory entries 750 or slots 718 at a time, thereby allowing multiple memory entry operations before the cache line bounces to the guest OS 734, which improves performance and throughput without increasing the size of the ring buffer 712 and wasting hardware resources or breaking migration and overcommit.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure, a system includes a memory including a ring buffer having a plurality of slots, a processor in communication with the memory, a guest operating system, and a hypervisor. The hypervisor is configured to detect a request associated with a memory entry, retrieve up to a predetermined quantity of memory entries in the ring buffer from an original slot to an end slot, and test a respective descriptor of each successive slot from the original slot through the end slot while the respective descriptor of each successive slot in the ring buffer remains unchanged. Each respective descriptor is associated with a corresponding respective memory entry in each respective successive slot from the original slot through the end slot. Additionally, the hypervisor is configured to execute the request associated with the memory entry and the respective descriptor responsive to determining the respective descriptor is a valid descriptor. The hypervisor is also configured to walk the ring buffer backwards from the end slot to the original slot and clear the valid descriptor in each slot between the end slot and the original slot.

In accordance with a 2nd exemplary aspect of the present disclosure, which may be used in combination with any one or more of the preceding aspects (e.g., the 1st aspect), the request is a request to transmit the respective memory entry from the memory, a request to copy the respective memory entry into a virtual machine memory, or a request to copy the respective memory entry out of a virtual machine memory.

In accordance with a 3rd exemplary aspect of the present disclosure, which may be used in combination with any one or more of the preceding aspects (e.g., the 1st aspect), the predetermined quantity of memory entries are stored in a first quantity of slots.

In accordance with a 4th exemplary aspect of the present disclosure, which may be used in combination with any one or more of the preceding aspects (e.g., the 3rd aspect), a second quantity of memory entries are retrieved, and the second quantity is less than the first quantity.

In accordance with a 5th exemplary aspect of the present disclosure, which may be used in combination with any one or more of the preceding aspects (e.g., the 1st aspect), the hypervisor is configured to detect the request from the guest operating system.

In accordance with a 6th exemplary aspect of the present disclosure, which may be used in combination with any one or more of the preceding aspects (e.g., the 5th aspect), the predetermined quantity of memory entries includes a first memory entry in the original slot, a second memory entry in an intermediate slot, and a third memory entry located in the end slot.

In accordance with a 7th exemplary aspect of the present disclosure, which may be used in combination with any one or more of the preceding aspects (e.g., the 1st aspect), the descriptor is any combination of a bit, a field entry, an address, and a packet length.

In accordance with an 8th exemplary aspect of the present disclosure, which may be used in combination with any one or more of the preceding aspects (e.g., the 7th aspect), a valid descriptor is any combination of a valid bit, a special value in the field entry, a non-zero address, and a non-zero packet length.

Aspects of the subject matter described herein may be useful alone or in combination with one or more other aspects described herein. In a 9th exemplary aspect of the present disclosure, a method includes detecting, by a hypervisor, a request associated with a memory entry. Additionally, the hypervisor retrieves up to a predetermined quantity of memory entries in the ring buffer from an original slot to an end slot and tests a respective descriptor of each successive slot from the original slot through the end slot while the respective descriptor of each successive slot in the ring buffer remains unchanged. Each respective descriptor is associated with a corresponding respective memory entry in each respective successive slot from the original slot through the end slot. Responsive to determining the respective descriptor is a valid descriptor, the hypervisor executes the request associated with the memory entry and the respective descriptor. Then, the hypervisor walks the ring buffer backwards from the end slot to the original slot and clears the valid descriptor in each slot between the end slot and the original slot.

In accordance with a 10th exemplary aspect of the present disclosure, which may be used in combination with any one or more of the preceding aspects (e.g., the 9th aspect), the request is a request to transmit the respective memory entry from a first memory to a second memory, a request to copy the respective memory entry into a virtual machine memory, or a request to copy the respective memory entry out of a virtual machine memory.

In accordance with an 11th exemplary aspect of the present disclosure, which may be used in combination with any one or more of the preceding aspects (e.g., the 9th aspect), the predetermined quantity of memory entries are stored in a first quantity of slots, the hypervisor retrieves a second quantity of memory entries, and the second quantity is less than the first quantity.

In accordance with a 12th exemplary aspect of the present disclosure, which may be used in combination with any one or more of the preceding aspects (e.g., the 9th aspect), the memory entries are packet addresses and the second memory is a virtual machine memory.

In accordance with a 13th exemplary aspect of the present disclosure, which may be used in combination with any one or more of the preceding aspects (e.g., the 12th aspect), the method further includes copying packet data into the VM memory from the retrieved packet addresses.

In accordance with a 14th exemplary aspect of the present disclosure, which may be used in combination with any one or more of the preceding aspects (e.g., the 9th aspect), walking the ring buffer backwards includes counting the quantity of memory entries as they are retrieved.

In accordance with a 15th exemplary aspect of the present disclosure, which may be used in combination with any one or more of the preceding aspects (e.g., the 9th aspect), walking the ring buffer backwards includes decrementing a counter while walking the ring buffer backwards.

In accordance with a 16th exemplary aspect of the present disclosure, which may be used in combination with any one or more of the preceding aspects (e.g., the 9th aspect), clearing the valid descriptor in each slot includes overwriting the descriptor with a different value.

In accordance with a 17th exemplary aspect of the present disclosure, which may be used in combination with any one or more of the preceding aspects (e.g., the 9th aspect), the hypervisor detects the request from a guest operating system.

In accordance with an 18th exemplary aspect of the present disclosure, which may be used in combination with any one or more of the preceding aspects (e.g., the 9th aspect), the predetermined quantity of memory entries includes a first memory entry in the original slot, a second memory entry in an intermediate slot, and a third memory entry located in the end slot.

In accordance with a 19th exemplary aspect of the present disclosure, which may be used in combination with any one or more of the preceding aspects (e.g., the 9th aspect), the hypervisor stops testing responsive to receiving a value other than a valid descriptor from one of the successive slots from the original slot through the end slot.

In accordance with a 20th exemplary aspect of the present disclosure, which may be used in combination with any one or more of the preceding aspects (e.g., the 9th aspect), the hypervisor stops testing responsive to retrieving the predetermined quantity of memory entries in the ring buffer.

In accordance with a 21st exemplary aspect of the present disclosure, which may be used in combination with any one or more of the preceding aspects (e.g., the 9th aspect), a cache line bounce occurs after clearing the valid descriptor in the original slot.

In accordance with a 22nd exemplary aspect of the present disclosure, which may be used in combination with any one or more of the preceding aspects (e.g., the 9th aspect), the descriptor is any combination of a bit, a field entry, an address, and a packet length.

In accordance with a 23rd exemplary aspect of the present disclosure, which may be used in combination with any one or more of the preceding aspects (e.g., the 9th aspect), a valid descriptor is any combination of a valid bit, a special value in the field entry, a non-zero address, and a non-zero packet length.

In accordance with a 24th exemplary aspect of the present disclosure, which may be used in combination with any one or more of the preceding aspects (e.g., the 9th aspect), clearing the valid descriptor includes overwriting a valid bit with an invalid bit, deleting a special entry in a valid field, overwriting a packet address with a zero value or NULL value, or changing a packet length to an invalid packet length.

Aspects of the subject matter described herein may be useful alone or in combination with one or more other aspects described herein. In a 25th exemplary aspect of the present disclosure, a non-transitory machine-readable medium stores code, which when executed by a hypervisor, is configured to detect a request associated with a memory entry. The non-transitory machine-readable medium is also configured to retrieve up to a predetermined quantity of memory entries in the ring buffer from an original slot to an end slot and test a respective descriptor of each successive slot from the original slot through the end slot while the respective descriptor of each successive slot in the ring buffer remains unchanged. Each respective descriptor is associated with a corresponding respective memory entry in each respective successive slot from the original slot through the end slot. The non-transitory machine-readable medium is configured to execute the request associated with the memory entry and the respective descriptor responsive to determining the respective descriptor is a valid descriptor. Additionally, the non-transitory machine-readable medium is configured to walk the ring buffer backwards from the end slot to the original slot and clear the valid descriptor in each slot between the end slot and the original slot.

Aspects of the subject matter described herein may be useful alone or in combination with one or more other aspects described herein. In a 26th exemplary aspect of the present disclosure, a system includes a means for detecting a request associated with a memory entry, a means for retrieving up to a predetermined quantity of memory entries in the ring buffer from an original slot to an end slot, and a means for testing a respective descriptor of each successive slot from the original slot through the end slot while the respective descriptor of each successive slot in the ring buffer remains unchanged. Each respective descriptor is associated with a corresponding respective memory entry in each respective successive slot from the original slot through the end slot. The system also includes a means for executing the request associated with the memory entry and the respective descriptor responsive to determining the respective descriptor is a valid descriptor, a means for walking the ring buffer backwards from the end slot to the original slot, and a means for clearing the valid descriptor in each slot between the end slot and the original slot.

Aspects of the subject matter described herein may be useful alone or in combination with one or more other aspects described herein. In a 27th exemplary aspect of the present disclosure, a system includes a first memory including a ring buffer having a plurality of slots, a second memory, a processor in communication with the memory, and a hypervisor. The hypervisor is configured to receive a request associated with a memory entry, store a location of an original slot in hypervisor memory, and test a respective descriptor of each successive slot from the original slot through an end slot while the respective descriptor of each successive slot in the ring buffer remains unchanged. Each respective descriptor is associated with a corresponding respective memory entry in each respective successive slot from the original slot through the end slot. The hypervisor is also configured to execute the request associated with the memory entry and the respective descriptor responsive to determining the respective descriptor is a valid descriptor. Responsive to executing the requests associated with each of the respective descriptors in the original slot through the end slot, the hypervisor is configured to increment a counter from an original value to an end value. Additionally, the hypervisor is configured to clear the valid descriptor in each slot between the end slot and the original slot while walking the ring buffer backwards.

In accordance with a 28th exemplary aspect of the present disclosure, which may be used in combination with any one or more of the preceding aspects (e.g., the 27th aspect), the request is a request to transmit the respective memory entry from a first memory to a second memory, a request to copy the respective memory entry into a virtual machine memory, or a request to copy the respective memory entry out of a virtual machine memory.

In accordance with a 29th exemplary aspect of the present disclosure, which may be used in combination with any one or more of the preceding aspects (e.g., the 27th aspect), the hypervisor is configured to walk the ring backwards a quantity of slots based on the difference between the end value and the original value of the counter.

In accordance with a 30th exemplary aspect of the present disclosure, which may be used in combination with any one or more of the preceding aspects (e.g., the 27th aspect), the hypervisor is configured to walk the ring backwards until reaching the location of the original slot.

Aspects of the subject matter described herein may be useful alone or in combination with one or more other aspects described herein. In a 31st exemplary aspect of the present disclosure, a method includes receiving, by a hypervisor, a request associated with a memory entry. The hypervisor stores a location of an original slot in hypervisor memory and tests a respective descriptor of each successive slot from the original slot through the end slot while the respective descriptor of each successive slot in the ring buffer remains unchanged. Each respective descriptor is associated with a corresponding respective memory entry in each respective successive slot from the original slot through the end slot. Responsive to determining the respective descriptor is a valid descriptor, the hypervisor executes the request associated with the memory entry and the respective descriptor. Responsive to executing the requests associated with each of the respective descriptors in the original slot through the end slot, the hypervisor increments a counter from an original value to an end value. Additionally, the hypervisor clears the valid descriptor in each slot between the end slot and the original slot while walking the ring buffer backwards.

In accordance with a 32nd exemplary aspect of the present disclosure, which may be used in combination with any one or more of the preceding aspects (e.g., the 31st aspect), the request is a request to transmit the respective memory entry from a first memory to a second memory, a request to copy the respective memory entry into a virtual machine memory, or a request to copy the respective memory entry out of a virtual machine memory.

In accordance with a 33rd exemplary aspect of the present disclosure, which may be used in combination with any one or more of the preceding aspects (e.g., the 31st aspect), clearing the valid descriptor in each slot includes overwriting the descriptor with a different value.

In accordance with a 34th exemplary aspect of the present disclosure, which may be used in combination with any one or more of the preceding aspects (e.g., the 31st aspect), the hypervisor stops testing responsive to receiving a value other than a valid descriptor from one of the successive slots from the original slot through the end slot.

In accordance with a 35th exemplary aspect of the present disclosure, which may be used in combination with any one or more of the preceding aspects (e.g., the 31st aspect), the hypervisor stops testing responsive to retrieving the predetermined quantity of memory entries in the ring buffer.

In accordance with a 36th exemplary aspect of the present disclosure, which may be used in combination with any one or more of the preceding aspects (e.g., the 31st aspect), a cache line bounce occurs after clearing the valid descriptor in the original slot.

In accordance with a 37th exemplary aspect of the present disclosure, which may be used in combination with any one or more of the preceding aspects (e.g., the 31st aspect), clearing the valid descriptor includes overwriting a valid bit with an invalid bit, deleting a special entry in a valid field, overwriting a packet address with a zero value or NULL value, or changing a packet length to an invalid packet length.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

The invention is claimed as follows:

1. A system comprising:
    a memory including a ring buffer having a plurality of slots;
    a processor in communication with the memory; and
    a hypervisor configured to:
        retrieve a plurality of memory entries in the ring buffer from an original slot to an end slot, each of the original slot to the end slot having a descriptor,
        test a respective descriptor of each successive slot from the original slot through the end slot,
        responsive to determining the respective descriptor of the end slot is a valid descriptor, execute a request associated with a memory entry or the respective descriptor of the end slot,
        walk the ring buffer backwards from the end slot to the original slot, and
        clear each valid descriptor in each slot between the end slot and the original slot.

2. The system of claim 1, wherein the request is one of a request to transmit a respective memory entry from the memory, a request to copy the respective memory entry into a virtual machine memory, or a request to copy the respective memory entry out of a virtual machine memory.

3. The system of claim 1, wherein the plurality of memory entries are stored in a first quantity of slots.

4. The system of claim 3, wherein the plurality of memory entries is a first plurality of memory entries, and wherein a second plurality of memory entries are retrieved, and the second plurality is of lesser quantity than the first plurality of memory entries.

5. The system of claim 1, wherein each descriptor is at least one of a bit, a field entry, an address, and a packet length, or wherein each valid descriptor is at least one of a valid bit, a special value in the field entry, a non-zero address, or a non-zero packet length.

6. A method comprising:
    retrieving a plurality of memory entries in a ring buffer from an original slot to an end slot, each of the original slot to the end slot having a descriptor;
    testing a respective descriptor of each successive slot from the original slot through the end slot;
    responsive to determining the respective descriptor of the end slot is a valid descriptor, executing, by a processor, a request associated with a memory entry or the respective descriptor of the end slot;
    walking the ring buffer backwards from the end slot to the original slot; and
    clearing each valid descriptor in each slot between the end slot and the original slot.

7. The method of claim 6, wherein the plurality of memory entries are stored in a first quantity of slots.

8. The method of claim 6, wherein walking the ring buffer backwards includes at least one of counting a quantity of memory entries as they are retrieved or decrementing a counter.

9. The method of claim 6, wherein clearing each valid descriptor in each slot includes overwriting each descriptor with a different value.

10. The method of claim 6, wherein the plurality of memory entries includes a first memory entry in the original slot, a second memory entry in an intermediate slot, and a third memory entry located in the end slot.

11. The method of claim 6, wherein the testing stops responsive to at least one of receiving a value other than a valid descriptor from one of the successive slots from the original slot through the end slot or retrieving the plurality of memory entries in the ring buffer.

12. The method of claim 6, wherein a cache line bounce occurs after clearing the valid descriptor in the original slot.

13. The method of claim 6, wherein clearing each valid descriptor includes at least one of overwriting a valid bit with an invalid bit, deleting a special entry in a valid field, overwriting a packet address with a zero value or NULL value, or changing a packet length to an invalid packet length.

14. The method of claim 6, wherein a plurality of requests associated with the plurality of memory entries are completed before a cache line bounces.

15. The method of claim 6, wherein the memory entry is a data packet.

16. The method of claim 6, wherein the memory entry is a packet address.

17. The method of claim 6, wherein the memory entry is an entry pointer.

18. The method of claim 6, further comprising starting a timer after testing a slot.

19. The method of claim 18, wherein the slot was previously cleared or has an invalid descriptor value, and a predetermined timespan passes before the slot is tested again.

20. A non-transitory machine-readable medium storing code, which when executed by a processor, causes the processor to:
    retrieve a plurality of memory entries in a ring buffer from an original slot to an end slot, each of the original slot to the end slot having a descriptor;
    test a respective descriptor of each successive slot from the original slot through the end slot;
    responsive to determining the respective descriptor of the end slot is a valid descriptor, execute a request associated with a memory entry or the respective descriptor of the end slot;
    walk the ring buffer backwards from the end slot to the original slot; and
    clear each valid descriptor in each slot between the end slot and the original slot.

* * * * *